United States Patent [19]
Grant

[11] 3,824,993
[45] July 23, 1974

[54] PHYSIO-THERAPY METHOD AND APPARATUS

[76] Inventor: James L. Grant, 602 S. University, Beaver Dam, Wis. 53916

[22] Filed: Jan. 2, 1973

[21] Appl. No.: 320,362

Related U.S. Application Data

[63] Continuation-in-part of Ser. No. 168,991, Aug. 4, 1971, abandoned.

[52] U.S. Cl.............................................. 128/25 R
[51] Int. Cl............................................. A61h 1/02
[58] Field of Search...................... 128/25 R; 272/73

[56] References Cited
UNITED STATES PATENTS

| | | | |
|---|---|---|---|
| 1,909,002 | 5/1933 | Oehlberg............................ | 128/25 R |
| 2,020,992 | 11/1935 | Caplan................................ | 128/25 R |
| 2,648,330 | 8/1953 | Clark.................................. | 128/25 R |
| 3,730,174 | 5/1973 | Madison............................ | 128/25 R |

Primary Examiner—Lawrence W. Trapp
Attorney, Agent, or Firm—Henry C. Fuller

[57] ABSTRACT

Apparatus for teaching brain-damaged children or adults the homolateral gestalt and cross-pattern gestalt includes commonly driven foot cranks and hand cranks which are adjustable to afford use of the cranks in the proper angular phase for cross-pattern therapy or homolateral therapy. The apparatus includes a motor and a variable speed drive to rotate the cranks and manipulate the patient's limbs in the proper sequence to teach the desired gestalt. A clutch in the drive train enables free wheeling of the cranks by the muscle power of the patient as learning progresses with use of the apparatus in the driven mode.

6 Claims, 5 Drawing Figures

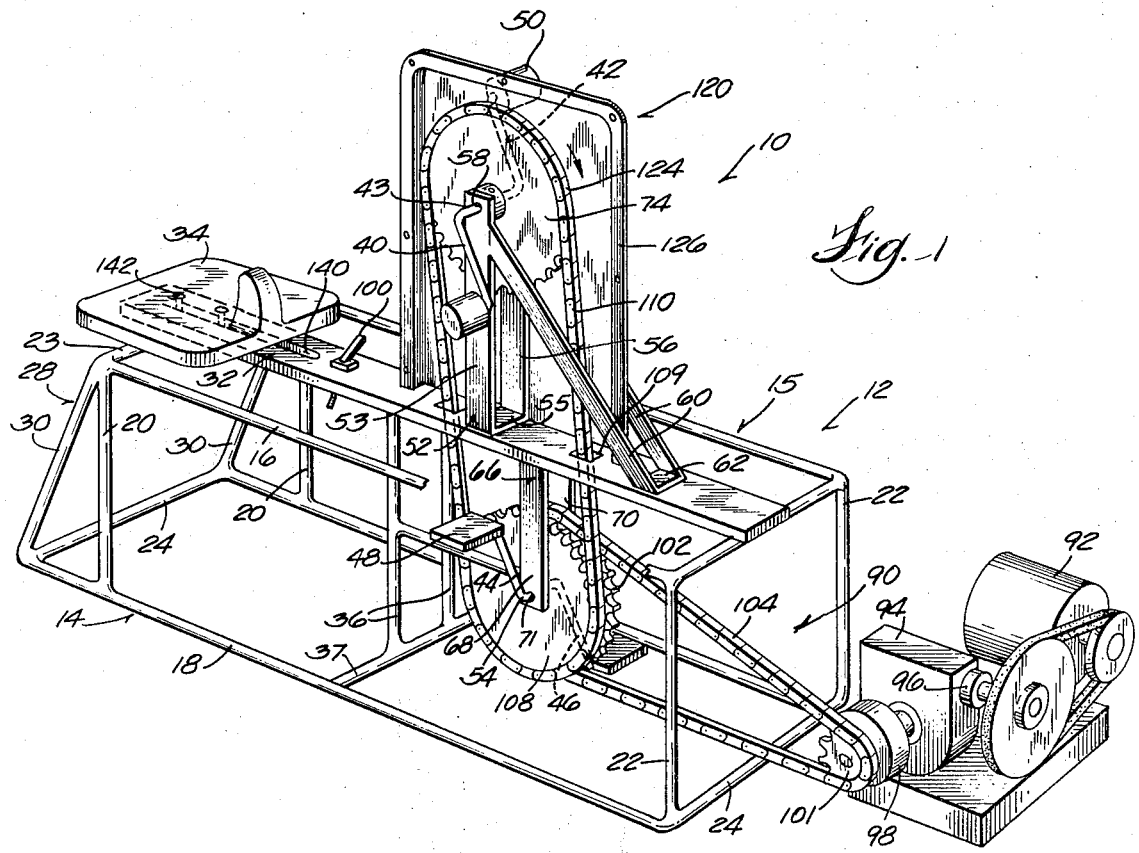
Fig. 1
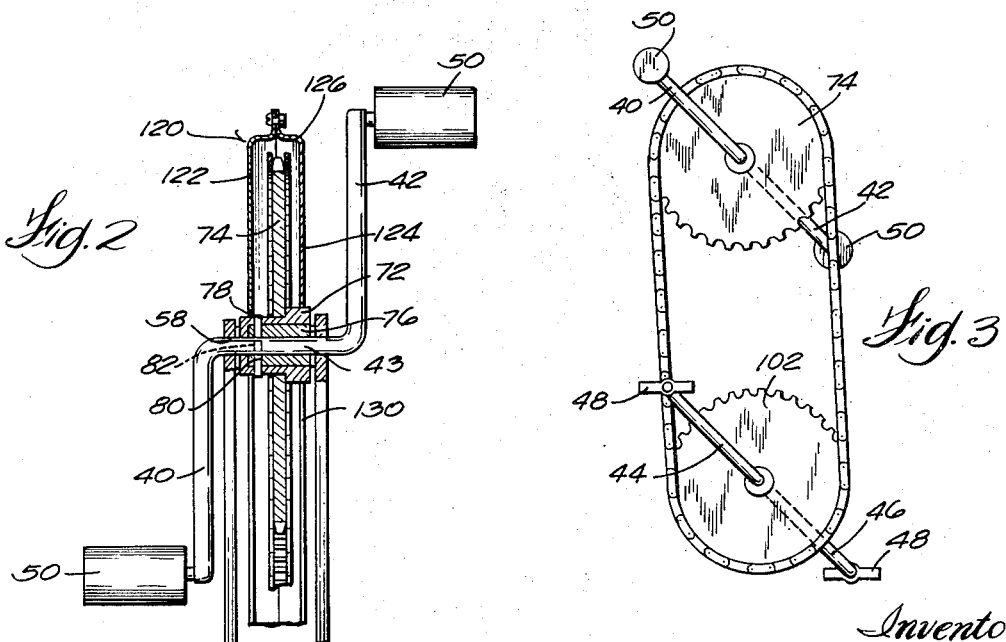
Fig. 2
Fig. 3
Inventor
James L. Grant
By Whuler, House & Whuler
Attorneys

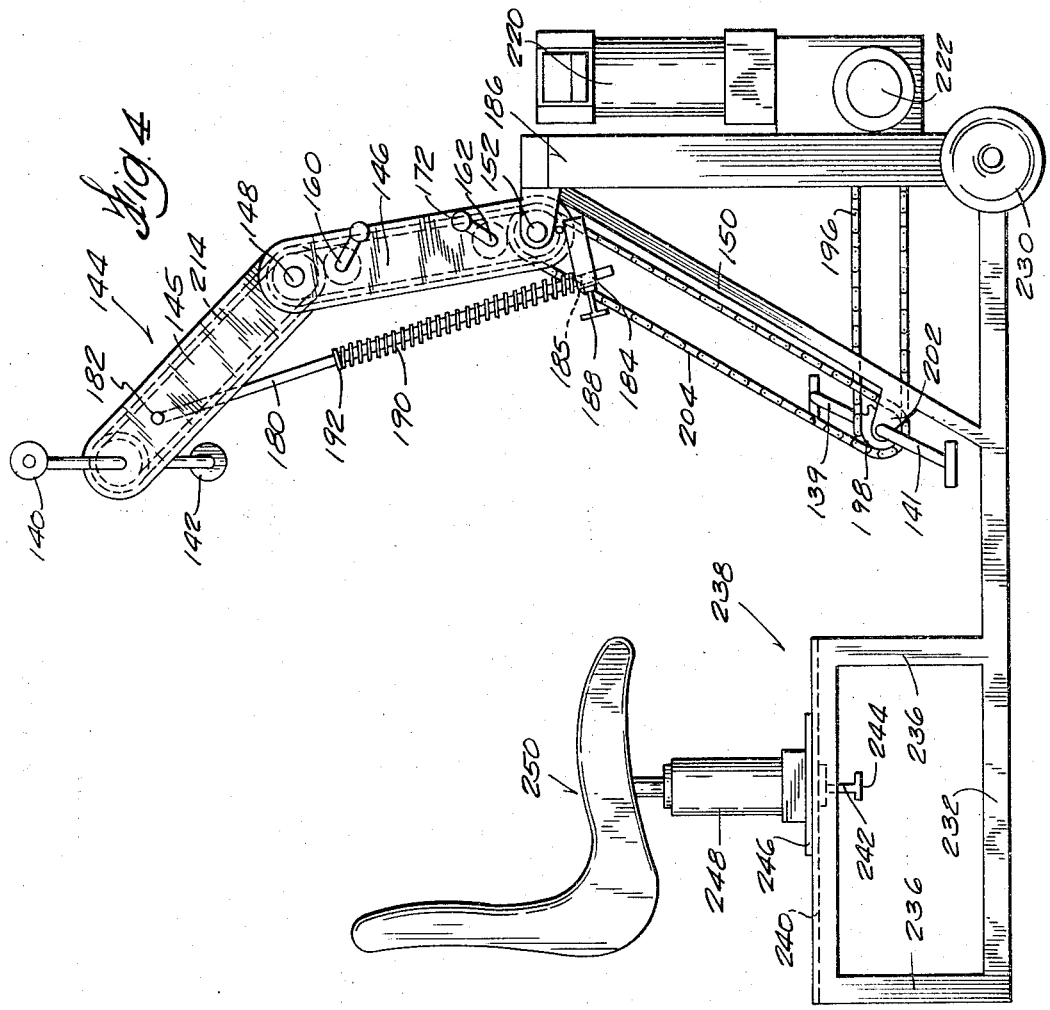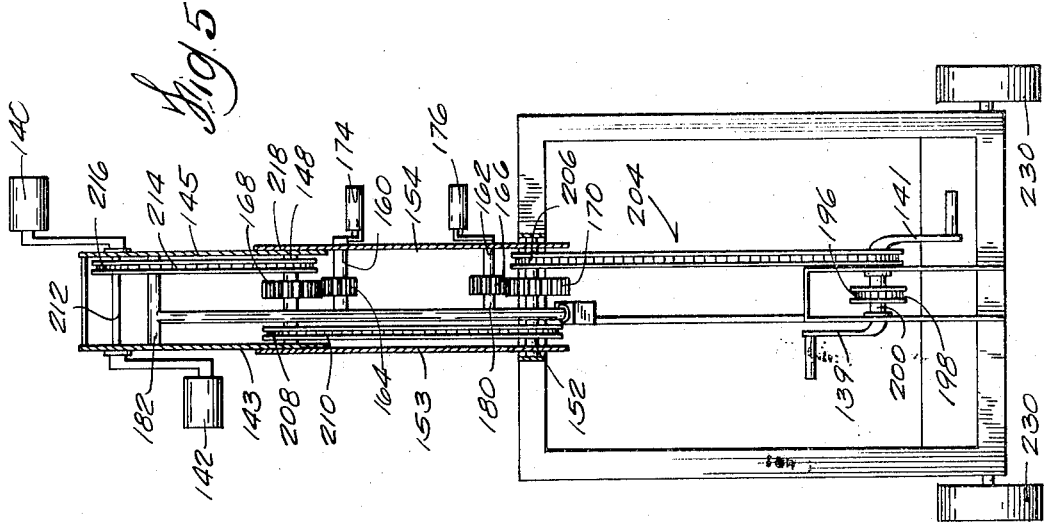

PHYSIO-THERAPY METHOD AND APPARATUS

CROSS REFERENCE

This application is a continuation-in-part application of application Ser. No. 168,991, now abandoned.

BACKGROUND OF INVENTION

Children afflicted with brain damage due to birth defects, accident, or disease frequently are unable to make the normal progress in mobility and development of the limbs. In the normal child, crawling is initially commenced without any pattern or synchronization between the limbs followed by crawling homologously in which arms and legs are moved in a frog-like sequence. After the child has learned to crawl homologously, the child learns to crawl in a homolateral pattern in which the child moves the right arm and right leg together and the left arm and left leg together but with no sequential action with the opposite arm and leg. After the child has achieved the homolateral pattern, it then can learn the cross-pattern gestalt in which the child pulls himself forward with the right arm and left leg followed by reversal of this sequence with the left arm and right leg. Once the cross-pattern crawling gestalt has been achieved, the child is then ready for creeping and subsequently walking.

Whereas the normal child appears to instinctively develop the appropriate limb movement for the homolateral and cross-pattern gestalts, the brain-damaged child or adult does not have any instinct to develop these co-ordinated movements unaided. It is known that repetitive external manipulation of the limbs in the proper synchronization for the various gestalts teaches the child the induced limb movements. Once the homolateral gestalt has been learned by external manipulation of the limbs, the patient is ready for the cross-pattern gestalt which prepares the child for crawling.

SUMMARY OF INVENTION

The method and apparatus of the invention provides manipulation of the limbs to teach the homolateral and cross-pattern gestalts. The frame includes a seat and also supports hand and foot cranks provided with sprockets which are commonly driven by a drive train having a motor with a variable speed drive and a clutch. The angular phase of the foot pedals and hand cranks can be adjusted for use in the homolateral pattern or the cross pattern. When used for homolateral pattern therapy, the right-hand crank and right foot pedal are in the same precise angular phase and the left foot pedal and left-hand crank are in the same phase. When used for cross-pattern therapy, the left foot pedal is in phase with the right-hand crank and the left-hand crank is in phase with the right foot pedal. The phase relationship of the crank is easily changed for cross-pattern therapy by withdrawing a pin which secures the hand crank to a chain sprocket and rotating the crank 180° and re-inserting the pin. The apparatus also includes a removable guard for the drive train and sprockets. Bands can also be employed for securing the feet and hands to the appropriate cranks. A clutch control accessible by the patient affords use of the machine either in a free wheeling mode or motor driven mode.

DESCRIPTION OF DRAWINGS

FIG. 1 is a perspective view with parts broken away of the physio-therapy apparatus of the invention with the hand and foot cranks synchronized for cross-pattern therapy.

FIG. 2 is a sectional view along lines 2—2 of FIG. 1.

FIG. 3 is a diagrammatic view showing the angular phase relationship of the hand and foot cranks synchronized for homolateral therapy.

FIG. 4 is a side elevational view of a modified embodiment of the invention.

FIG. 5 is an end view of the apparatus shown in FIG. 4.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, the apparatus 10 includes a frame 12 having two spaced side frame portions 14 and 15 which have upper and lower horizontal frame runs 16 and 18 and vertical runs 20 and 22. The side frames are inner-connected at there ends by upper and lower cross frame portions 23 and 24 at the ends of the side frames 14 and 15. Additional support can be provided by an end frame 28 which has downwardly and outwardly inclined runs 30. A platform 32 supported by the cross-frame portions is provided with a seat 34 for the patient. The platform 32 can be supported intermediate its length by vertical frame portions 36 connected to a cross frame portion 37.

The apparatus 10 includes right and left-hand cranks respectively 40 and 42 which are connected by and integrally formed with a horizontal portion 43 and are offset or 180° out of phase. The apparatus also includes right and left foot cranks 44 and 46 which are connected by and integrally formed with horizontal portions 54 and provided with pedals 48. The foot cranks 44, 46 are offset or 180° out of phase. The hand cranks can be provided with pivotally supported hand grips 50.

Means are provided for rotatably supporting the foot and hand cranks on the platform 32. In the disclosed construction, the means include an upper or first fork 52 with upwardly projecting opposed spaced fork legs 53 and 56 interconnected by a web portion 55 which is secured to the platform 32. Apertures 58 in the fork legs receive the connecting portion 43 (FIG. 2) for the cranks. An inclined support bracket 60 secured at one end 62 to the platform 32 and at the other end to the fork legs 53, 56 provides additional support. The foot cranks are supported on the platform by a second or lower fork 66 which has downwardly extending fork legs 68 and 70 with apertures 71 which receive the connecting portion 54 of the foot cranks.

Means are provided for adjustably synchronizing the hand cranks with respect to the foot cranks to vary the angular relationship for a cross-pattern therapy operational mode or a homolateral pattern therapy operational mode. In the disclosed construction, the means comprises a hub 72 on the sprocket 74 (which forms a part of the drive train as subsequently described) and a hub 76 on the connecting portion 43 with the hub 70 interfitting in the hub 72. A cross pin 78 extends through apertures 80 in the hub 76 and aperture 82 in the connection portion 43. Removal of the cross pin 78 and rotation of the crank 180° will enable use of the apparatus for either cross pattern or homolateral therapy.

In FIG. 1 the hand cranks and foot pedals are synchronized for cross-pattern therapy with the right-hand crank 40 and left foot crank 46 in the same angular phase and the left-hand crank 42 and right foot crank 44 in the same angular phase. In FIG. 3 the right-hand crank 40 and right foot crank 44 are 180° out of phase and the left crank 42 and left foot crank are 180° out of phase. Thus the lefthand and right foot and the right-hand and left foot will be working together as the cranks are moved forwardly and downwardly from the FIG. 1 position.

In FIG. 3 the foot and hand cranks are synchronized for homolateral therapy by removing the pin 78 and rotating the connecting portion 43 180°. Thus the right-hand crank 40 and the right foot crank 44 are in angular phase and the left hand crank 42 and left foot crank 46 are in phase with each other and 180° out of phase with the right-hand crank 40 and right foot crank 46.

The apparatus 10 also includes a drive train 90 for rotating the hand and foot cranks. As disclosed, the drive train 90 includes a motor 92, a variable speed drive 94 with a speed adjustment control member 96 and a clutch 98 which can be electrical or mechanical and operable by a clutch control lever or switch 100 located for convenient access by the patient on the platform 32. A sprocket 101 on the clutch output shaft is connected to a sprocket 102 fixed to the connecting portion 54 of the foot cranks by a chain 104. A sprocket 108 fixed to the connecting portion 54 is connected to the upper sprocket 74 by a chain 110 which can travel through apertures 109 in the platform 32. The sprockets 108 and 74 have the same number of teeth and thus rotate at the same speed in the selected synchronized mode.

The apparatus 10, also includes a chain and sprocket guard 120 which has two opposed spaced side panels 122, 124 (FIG. 2) which have inturned interconnected flanges 126. Vertical slots 130 in the side panels 122, 124 are open at the lower end and thus the guard can be lowered over the crank connecting portion 43 and supported by the platform 32.

In use of the apparatus of the invention, the hand and foot cranks are typically driven by the motor until learning progresses to the point where the patient can accomplish the required limb movement without the assistance of the motor. Rotation of the cranks under the patient's own power develops the patient's muscles in addition to teaching the desired pattern. Various types of motors and drive trains can be employed including reversible motors and motors with reversible windings which can be stalled and which can be operated to cause a drag on the sprocket movement to increase the effort required to rotate the cranks.

Although in the disclosed construction the motor is shown outside of the frame, it can be conveniently located beneath the seat 34 and supported by frame members 18.

As shown in FIGS. 1 and 3, the sprocket 74 is offset rearwardly from the sprocket 108 or toward the seat 34 to enable the patient to sit in an erect position and develop good posture. The slot 34 is slidably mounted on the platform 32 by a slot 140 in the platform 32 and bolts 142 which extend through the slot. Thus the seat 34 can easily be adjusted to accommodate young and old patients.

FIG. 4 shows a modified embodiment of the invention with hand cranks 140 and 142. Means are provided for rotatably supporting the hand cranks to vary the spacing of the hand cranks and the foot cranks 139, 141 and afford adjustment of the distance of the hand cranks from the patient. As disclosed, the means includes a hand crank support 144 which is rotatably connected to an intermediate support 146 by a cross shaft 148. The cross shaft 148 is fixed to the side panels 143, 145 of the support 144 to cause movement of the support 144 upon movement of the shaft 148 as subsequently described. The intermediate support 146 is rotatably connected to a lower housing or foot crank support member 150 by a shaft 152. The shaft 152 is fixedly connected to the side panels 153, 154 of support member 146 which is moved when the shaft 152 is rotated.

Means are provided for adjusting the angular position between the support members. In the disclosed construction, the means comprises adjustment shafts 160 and 162 which are rotatably supported in the side panels 153, 154. The adjustment shafts 160, 162 are provided with gears 164 and 166 which respectively mesh with gears 168 and 170. Gear 168 is fixed to the pivot shaft 148 and gear 170 is fixed to the pivot shaft 152. Manipulation of the adjustment crank or arm 174 connected to shaft 160 will vary the angle between the support members 144 and 146. Manipulation of the adjustment arm or crank 176 connected to shaft 162 will cause variation of the angle between the support member 146 and the support member 150 as well as the angle between the support member 144 and support member 150.

Means are provided for maintaining the support members 144 and 146 at the selected angular position. In the disclosed construction, the means comprises a rod 180 which is connected at its upper end to a cross rod 182 (FIG. 5) which is rotatably supported between the side plates 143, 145. The lower end of the rod 182 is slidably received in an aperture 185 in a block 184 fixed to the frame 186. A bolt or thumb screw 188 threaded in the block 184 secures the rod 180 at the desired position. A compression spring 190 arranged around the rod 180 and located between an abutment 192 on the rod and the block 184 provides an assist for raising the support 144.

The hand and foot cranks 140, 142 and 139, 141 are driven by a drive train which includes a chain 196 which is arranged around a sprocket 198. The sprocket 198 is fixed to shaft 200 which is rotatably supported between frame portions 202. The shaft 152 is rotated by a chain 204 which is arranged around a sprocket 206 which is fixed to the shaft 152. The shaft 152 is drivingly connected to a sprocket 208 on shaft 148 by a chain 210. The shaft 212 connecting the hand cranks 140 and 142 is drivingly connected to shaft 148 by chain 214 arranged around sprockets 216 and 218.

Power is supplied to the chain 196 by an electric motor 220 and a variable speed drive and clutch 122. The motor and clutch in addition to affording free wheeling of the hand cranks when disengaged can also be operable to cause a resistance to rotation of the cranks by the patient.

The frame 186 can be provided with wheels 230 and a beam 232 provided with uprights 236 which support a platform 238. The platform is provided with a longitudinal slot 240 which receives a threaded stud 242 provided with wing nut 244. The stud 242 is connected to the base 246 of a manually operated hydraulic lift 248 which is connected to a seat shell 250.

What is claimed is:

1. Physio-therapy apparatus comprising a frame, a seat supported on said frame, right and left interconnected hand cranks 180° out of phase, right and left interconnected foot cranks 180° out of phase, support means for rotatably supporting said hand and foot cranks, and means for varying the spacing of the rotational axes of said cranks and afford adjustment of the distance of said cranks from said seat and a patient supported on the seat.

2. Physio-therapy apparatus in accordance with claim 1 wherein said support means includes an intermediate member, means for pivotally connecting said hand crank support member to said intermediate member, means for pivotally connecting the foot crank support member to said intermediate member, and means connected to said hand crank support member and the frame to maintain said members in a selected angular position.

3. Apparatus in accordance with claim 2 including means for adjusting the angular position between said support members, said last named means including first and second adjustment arms rotatably supported in said intermediate member and means connected to said adjustment arms and to said hand crank support member and said foot crank support member to afford adjustment of the angular position of said hand crank support member and said foot crank support member upon movement of the adjustment arms.

4. Apparatus in accordance with claim 3 wherein said means connected to said adjustment arms comprises adjustment shafts, gears on said adjustment shafts and first and second shafts providing the pivotal connections between said support members with said shafts being fixed to said foot and hand support members and gears on said adjustment shafts meshing with gears on said shafts.

5. Apparatus in accordance with claim 4 including drive means connecting said foot crank to said first shaft and drive means connecting said hand crank to said second shaft and drive means connecting said first and second shafts.

6. Physio-therapy apparatus comprising a frame, a seat supported on said frame, right and left interconnected hand cranks, right and left interconnected foot cranks, support means for rotatably supporting said hand and foot cranks, and means for varying the spacing of the rotational axes of said cranks and afford adjustment of the distance of said cranks from said seat and a patient supported on the seat.

* * * * *